United States Patent [19]

Nakamura et al.

[11] Patent Number: 4,476,529
[45] Date of Patent: Oct. 9, 1984

[54] CONTROL SYSTEM FOR A POWER STEERING DEVICE

[75] Inventors: Keiichi Nakamura, Kariya; Yutaka Mori, Toyokawa; Yoshiharu Inaguma, Nagoya, all of Japan

[73] Assignee: Toyoda Koki Kabushiki Kaisha, Kariya, Japan

[21] Appl. No.: 411,349

[22] Filed: Aug. 25, 1982

[30] Foreign Application Priority Data

Sep. 16, 1981 [JP] Japan ................... 56-145706

[51] Int. Cl.³ ............................................. B62D 5/06
[52] U.S. Cl. ................................... 364/424; 180/142
[58] Field of Search .............. 364/424, 425; 180/79.1, 180/132, 140, 141, 142, 143

[56] References Cited

U.S. PATENT DOCUMENTS

| | | | |
|---|---|---|---|
| 3,881,567 | 5/1975 | Leiber | 180/142 |
| 3,897,846 | 8/1975 | Inoue | 180/142 |
| 4,320,812 | 3/1982 | Takaoka et al. | 180/143 |
| 4,392,540 | 7/1983 | Michio et al. | 180/142 |
| 4,412,594 | 11/1983 | Furukawa et al. | 180/142 |
| 4,418,780 | 12/1983 | Ito et al. | 180/142 |

FOREIGN PATENT DOCUMENTS

53-35330 9/1978 Japan.
54-14368 6/1979 Japan.

Primary Examiner—Gary Chin
Attorney, Agent, or Firm—Oblon, Fisher, Spivak, McClelland & Maier

[57] ABSTRACT

A control system for a power steering device of a vehicle, wherein the rotational angular position of a steering wheel, the vehicle driving speed and the steering torque applied to the steering wheel are detected and processed by a digital computer. The computer selects one of plural control values stored in a memory device based upon the detected steering torque and the detected vehicle speed and outputs the selected one of the control values along with solenoid selection data which is determined based upon the detected rotary angular position data. An electric current having a value corresponding to the selected one of the control values is applied from a solenoid drive circuit to one of a pair of solenoids, so that a four-way open center type solenoid valve having the solenoids controls the supply and exhaust of pressurized fluid to and away from a power cylinder of the power steering device in accordance with the detected vehicle driving speed and the detected steering torque.

4 Claims, 7 Drawing Figures

CONTROL SYSTEM FOR A POWER STEERING DEVICE

BACKGROUND OF THE INVENTION

1. Field of the Invention

The present invention relates in general to a control system for a power steering device and particularly, to such a control system for controlling the supply and exhaust of pressurized fluid to and from a power cylinder of the power steering device in accordance with various control inputs such as vehicle speed, steering angle, manual steering torque and so forth.

2. Description of the Prior Art

In power steering devices, generally, a servovalve is actuated upon receipt of steering torque manually applied to a steering wheel mechanically coupled thereto so that the supply and exhaust of pressurized fluid to and from a power cylinder is controlled. For the purpose of controlling its steering characteristic in response to various parameters such as steering angle, vehicle speed and so forth, a known power steering device of this type is provided with a solenoid valve in addition to the above-noted servovalve. This solenoid valve controls the pressure of fluid supplied to a counterforce generating chamber of the servovalve or controls the flow volume of fluid bypassed from a supply passage directly to an exhaust passage without passing through the servovalve.

As noted above, the prior control system requires the solenoid valve or the like for steering characteristic control, in addition to the mechanically actuated servovalve. This disadvantageously results in an expensive control system, and one which is liable to be limited only to the controlling of steering force.

SUMMARY OF THE INVENTION

Accordingly, a primary object of the present invention is to provide an improved control system for a power steering device capable of obtaining a desired steering characteristic by applying control current optimum to one or more control parameters to solenoids of a four-way open center type solenoids valve which has no mechanical connection with a steering force transmitting mechanism and which controls the supply and exhaust of pressurized fluid to and from a power cylinder of the power steering device.

Another object of the present invention is to provide an improved control system of the type set forth above, which is also capable of controlling the assisting force applied to facilitate the returning of a steering wheel to a neutral position.

A further object of the present invention is to provide an improved control system of the type set forth above wherein the manipulation of a switch results in automatically returning a steering wheel to a neutral position when the vehicle has been stopped.

Briefly, these and other objects are achieved according to the present invention by providing a novel control system including a four-way open center type solenoid valve having a pair of solenoids, to which electric current is applied for controlling the supply and exhaust volume of pressurized fluid to and from a power cylinder of a power steering device, first and second detectors for respectively detecting the rotary angular position of a steering wheel and the driving speed of a vehicle, a data memory for storing a plurality of control values, and a control circuit device for controlling the electric current applied to the solenoids, wherein the control circuit device is responsive to rotary angular position data from the first detector for selecting one of the solenoids and is also responsive to driving speed data for selecting one of the plurality of the control values from the data memory so that an electric current having a value corresponding to the selected one of said control values is applied to the selected of the solenoids.

Within this configuration, electric current applied to the solenoids is controlled in correspondence to the vehicle driving speed when the steering wheel is rotated. It is therefore realized to control the steering characteristic of the power steering device in proportion to the vehicle driving speed, thereby providing the power steering device with a high-speed stabilizing function.

In another aspect of the present invention, a plurality of second control values are also stored in the data memory, and the control circuit device is constructed by a digital computer and a solenoid drive circuit. The digital computer, when confirming that the steering wheel is returning toward a neutral position, reads out one of the second control values from the data memory and outputs it to the solenoid drive circuit. The drive circuit applies to a selected one of the solenoids an electric current having a value corresponding to the read-out second control value, whereby an assisting force optimum to the vehicle driving speed is generated to facilitate the return of the steering wheel to the neutral position.

In a further aspect of the present invention, a switch is provided for instructing the return of the steering wheel to the neutral position. Confirming stopping of the vehicle and the manipulation of the switch, the digital computer judges the existence of a substantial angular deviation of the steering wheel from the neutral position and the direction of the substantial angular deviation and outputs a fixed control value along with solenoid selection data to the solenoid drive circuit until the angular deviation of the steering wheel is reduced to less than a predetermined value. Consequently, the manipulation of the switch results in automatically returning the steering wheel to the neutral position when the vehicle has been stopped.

BRIEF DESCRIPTION OF THE DRAWINGS

A more complete appreciation of the invention and many of the attendant advantages thereof will be readily appreciated as the same becomes better understood by reference to the following detailed description, when considered in connection with the accompanying drawings, in which.

DESCRIPTION OF THE PREFERRED EMBODIMENTS

Figure 1:
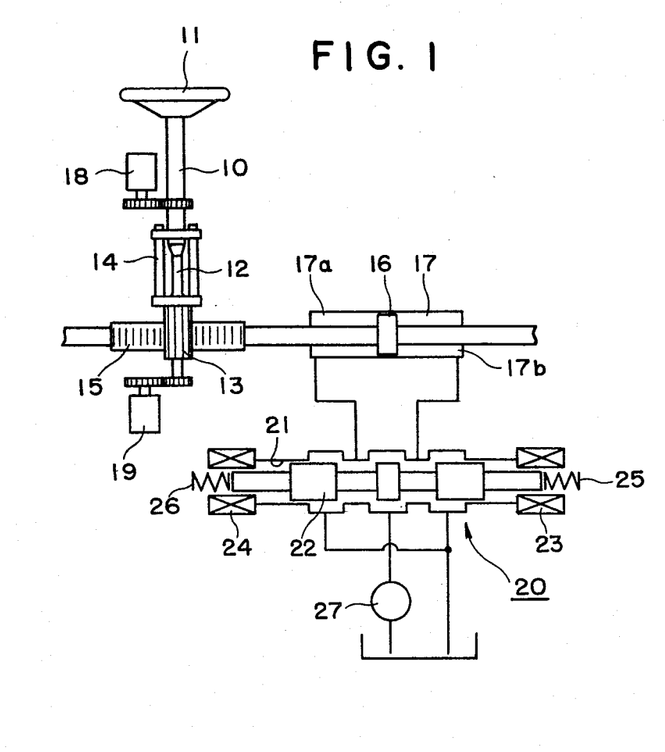
FIG. 1 is a schematic diagram of a power steering device with a control system according to the present invention.

Referring now to the drawings, wherein like reference numerals designate identical or corresponding parts throughout the several views, and more particularly to FIG. 1 thereof, there is shown a rack and pinion type power steering device. A numeral 10 denotes a steering shaft, which is connected at its one end with a steering wheel 11 and at its other end with a pinion shaft 13 through a torsion bar 12 so as to be rotatable relative thereto. The pinion shaft 13 is fixedly provided with a multi-rod type coupling 14, which is connected to the steering shaft 10 with a play for relative rotation thereto within a predetermined angular extent, so that the upper limit of torsional torque applied to the torsion bar 12 is chosen. The pinion shaft 13 is in mesh with a rack shaft 15, on which fixedly provided is a piston 16 slidably contained in a power cylinder 17. This piston 16 partitions the power cylinder 17 into left and right chambers 17a and 17b. The opposite ends ot the rack shaft 15 are connected to steerable wheels, not shown, through known means such as a tyng rod, knuckle arm, etc.

A first rotary angle sensor 18 is in rotational connection to the steering shaft 10 so as to detect the rotary angle $\theta 1$ of the steering shaft 10. A second rotary angle sensor 19 is in rotational connection to the pinion shaft 13 so as to detect the actually steered angle $\theta 2$. Each of these sensors 18 and 19 is composed of a potentiometer, which is capable of outputting a respective signal with positive polarity when an associated one of the steering shaft 10 and the pinion shaft 13 is rotated in a clockwise direction and a signal with negative polarity when rotated in a counterclockwise direction.

In FIG. 1, there is further shown a four-way open center type solenoid valve 20 for supplying and exhausting pressurized fluid to and from the power cylinder 17. It is noted herein that the solenoid valve 20 is provided independently of the steering mechanism of the aforementioned power steering device, that is, without any mechanical connection with the steering shaft 10 in operation. The solenoid valve 20 includes a spool 22 slidably received in a valve chamber 21, a pair of solenoids 23 and 24 disposed at the opposite end portions of the spool 22 and capable of generating attractive force proportional to an electric current applied thereto, and a pair of compression springs 25 and 26 for normally maintaining the spool 22 in a neutral position. When the solenoid 23 is energized, the spool 22 is displaced toward the right to distribute pressurized fluid from a pump 27 to the left chamber 17a of the power cylinder 17, whereby a rightward deviation force is applied to the steerable wheels, not shown. When the other solenoid 24 is energized, the spool 22 is displaced towards the left and distributes pressurized fluid to the right chamber 17b of the power cylinder 17 whereby a leftward force is applied to the steerable wheels. The force that the power cylinder 17 generates is controlled in accordance with the displacement amount of the spool 22 from the neutral position.

Figure 2:
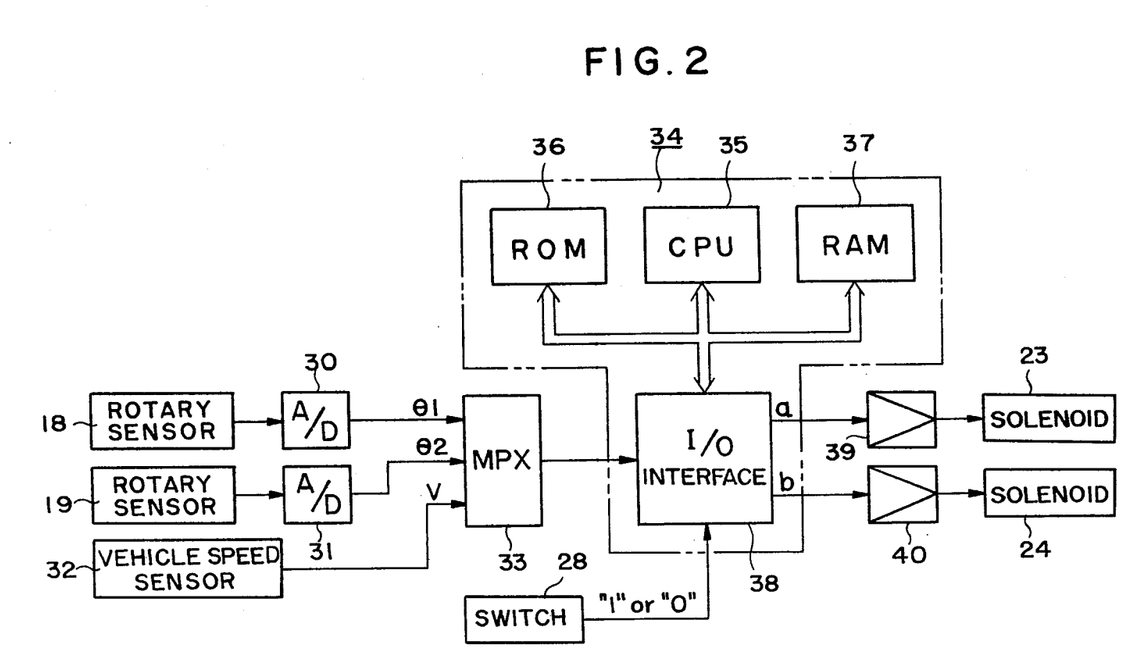
FIG. 2 is a block diagram of the control system according to the present invention.

Referring now to FIG. 2, which is illustrative of a control circuit for the solenoids 23 and 24, there are provided A-D converters 30 and 31 for respectively converting analog outputs from the first and second rotary angle sensors 18 and 19 to corresponding digital values and a digital vehicle speed sensor 32 for detecting vehicle speed V. The digital outputs from the vehicle speed sensor 32 and the A-D converters 30 and 31 are supplied to a multiplexer 33 and are selected by the same on a time-shared basis to be input to the control circuit 34 constructed of a microcomputer.

The control circuit 34 includes a central processing unit "CPU" which executes digital arithmetic processing, a read-only memory "ROM" 36 for storing a fixed program described later in detail, a random access memory "RAM" 37 and an I/O interface circuit 38. The functions of the I/O interface circuit 38 are to transmit a control signal from the multiplexer 33 to the CPU 35 and to output an electric signal current selectively from two output ports (a) and (b) to the pair of the solenoids 23 and 24 through amplifiers 39 and 40. The CPU 35 is programmed to calculate a manual steering torque value TM based upon the steering rotary angle $\theta 1$ and the actually steered angle rotary angle $\theta 2$ and also to judge the steering return based upon a change of the actually steered rotary angle $\theta 2$ per unit time.

That is, the steering wheel 11 is judged to be returning when the output signal $\theta 2$ from the second rotary angle sensor 19 has positive polarity (i.e., right turn) and changes with a decreasing ($-\Delta\theta 2$) within a unit period of time. The steering wheel 11 is judged to be returning also when the output signal $\theta 2$ from the second rotary angle sensor 19 has negative polarity (i.e., left turn) and changes with an increasing trend ($-\Delta\theta 2$) within the unit period of time.

Figure 3:
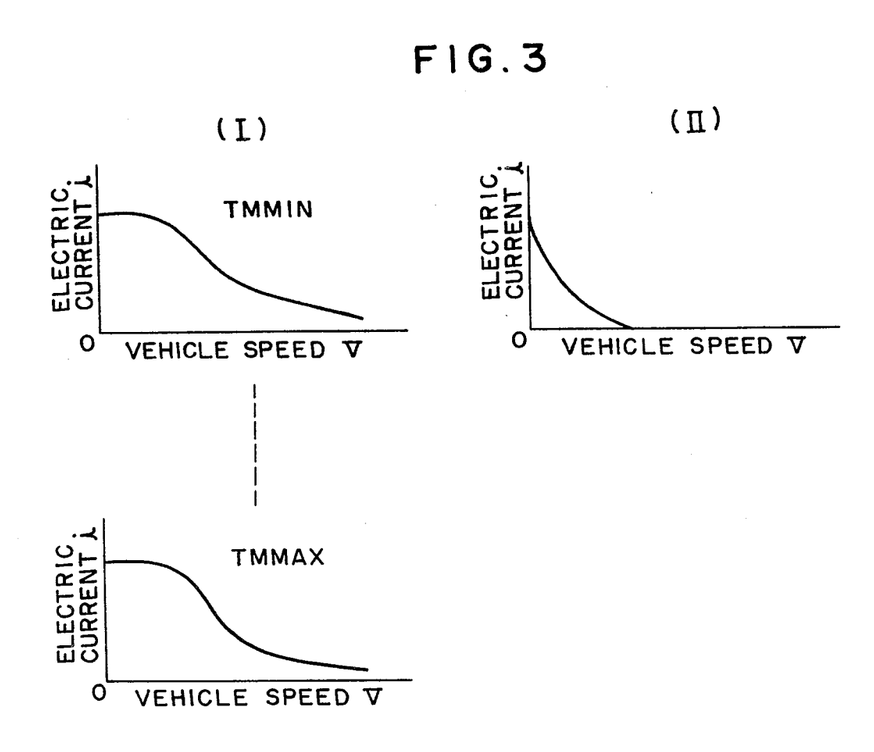
FIG. 3 is the graphs showing various vehicle speed data and associated control current data stored in a read-only memory shown in FIG. 2.

FIG. 3 shows in the form of graphs the fixed programs stored in the ROM 36. The fixed programs include a characteristic map I and a return map II. The characteristic map I is provided for making the characteristic of the solenoid valve 20 relative to the steering torque TM non-linear and for changing the characteristic of the solenoid valve 20 in accordance with the increase of the vehicle speed V in such a way as to obtain high-speed stability. On the characteristic map I, there are allotted a plurality of program areas respectively corresponding to a plurality of torque ranks which are determined in connection with the magnitude of the steering torque TM. Each of the program areas contains various electric current values i which are chosen to be optimum to various vehicle speeds V in a corresponding one of the torque ranks. In a read-out operation, one of the program areas is designated based upon a calculated steering torque value TM, and one of addresses of the designated program area is then designated upon the value of a detected vehicle speed V with a result of reading out a control current value i from the designated address.

On the other hand, the return map II is used in controlling the bias current i which is applied to facilitate the returning of the steering wheel to the neutral position. On the return map II, there are stored various bias current values i, which are chosen in correspondence respectively to various vehicle speeds V existing when the steering wheel 11 is being returned. The return map II stores these bias current values i for the vehicle speeds V which are within a low speed range, and the choice of the biases (control current values i) relative to the vehicle speeds V is such that the bias is increased as the vehicle speed is reduced.

Figure 4:
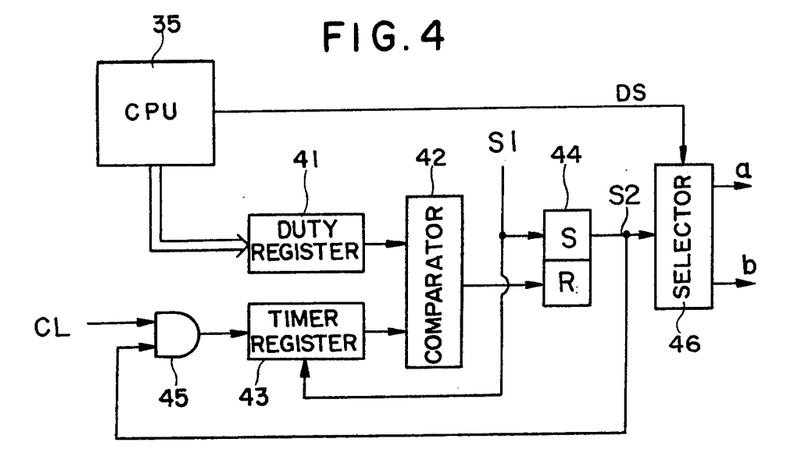
FIG. 4 is a block diagram of a solenoid drive circuit provided in an interface circuit shown in FIG. 2.

FIG. 4 shows a solenoid drive circuit provided in the above-noted I/O interface circuit 38. The control current value i set in an output buffer register, not shown, of the CPU 35 is input to a duty register 41 at a predetermined time interval To and further, to a comparator 42. An output from a timer register 43 is also input to the comparator 42, which resets a flip-flop 44 when outputting a coincidence signal. A set output signal S2 from the flip-flop 44 is supplied to an AND gate 45 which received a train of clock pulses CL shown in FIG. 5. The outputs of the AND gate 45 are input to the timer register 43. The flip-flop 44 is set each time it receives a signal S1 which is generated at every N-th clock pulse of the train of the clock pulses CL, and accordingly, at the predetermined time internal To. The timer register 43 is reset each time of receiving the signal S1.

Figure 5:
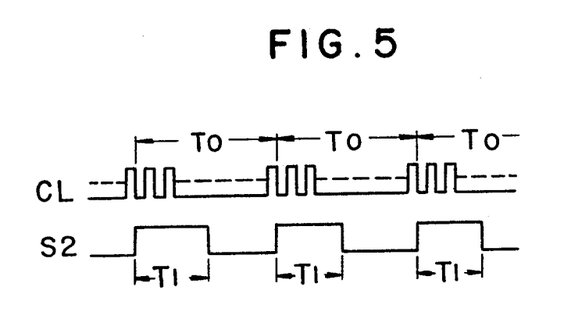
FIG. 5 is a timing diagram of signals shown in FIG. 4.

Accordingly, while a control current calue i is stored in the duty register 41, the comparator 42 ouputs a coincidence signal to reset the flip-flop 44 each time the number of the clock pulses CL counted by the timer register 43 reaches the control current value i. Since the flip-flop 44 is set at the predetermined time interval To the set-output signal S2 of the flip-flop 44 is output during a predetermined time interval T1 of time which corresponds to the control current value i, within the predetermined time interval To, as shown in FIG. 5. The set-output signal S2 is applied to a solenoid selector 46 which is responsive to a designation signal DS from the CPU 35 to select the solenoids 23 and 24 of the solenoid valve 20. Consequently, each of the solenoids 23 and 24 generates attractive force corresponding to an effective value of the duty output signal S2 so as to displace the spool 22 in proportion to the control current value i, whereby the steering characteristic of the power steering device is controlled as desired, namely as programmed in the ROM 36. Numerals 39 and 40 respectively designate amplifiers for amplifying the duty output signals S2 to the solenoids 23 and 24.

The operation of the control system as constructed above will be described hereinafter with reference to program flow charts shown in FIGS. 6(A) and 6(B). Each of the control inputs, namely steering rotary angle $\theta 1$, actually steered angle $\theta 2$ and vehicle speed V which change momentarily, is detected by a corresponding one of the sensors 18, 19 and 32 and is applied to the microcomputer 34 through the multiplexer 33 so as to be stored in the RAM 37.

Figure 6A:
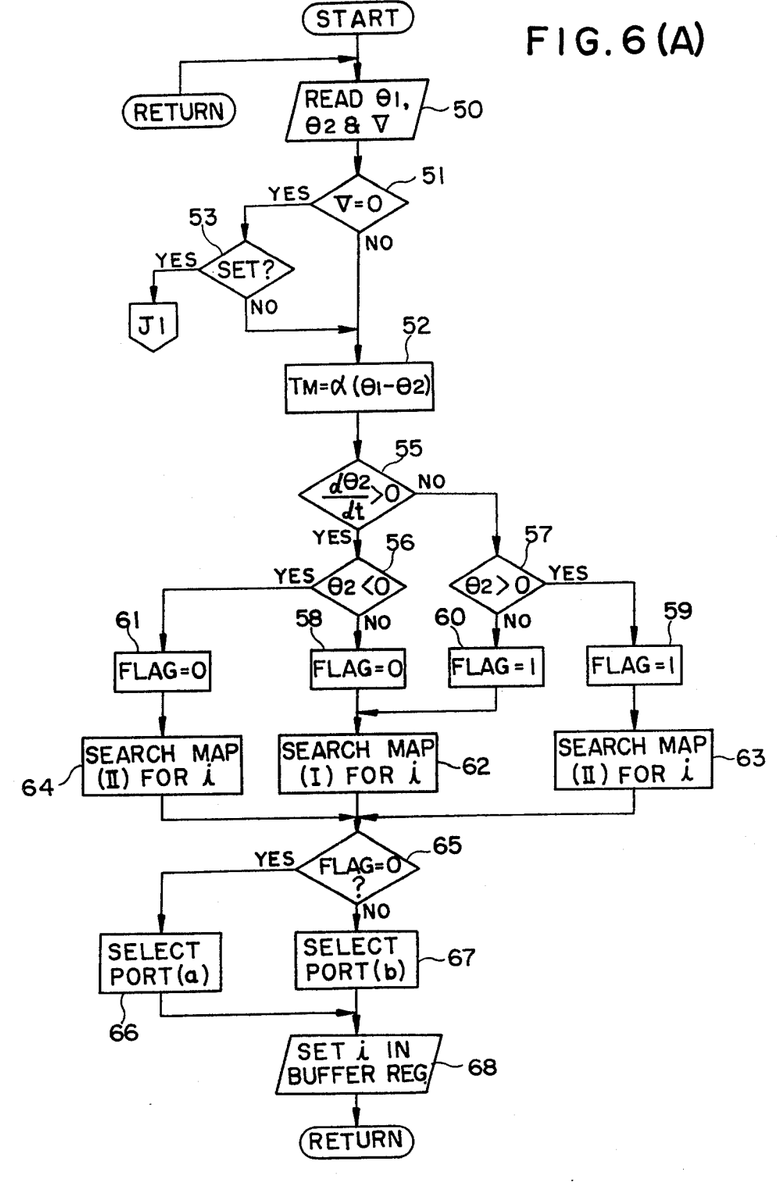
FIGS. 6(A) and 6(B) are flow charts of a program for a digital computer shown in FIG. 2.

With the control program being started, the first step 50 in FIG. 6(A) is executed, wherein the steering rotary angle data $\theta 1$, the actually steered angle data $\theta 2$ and the vehicle speed data V are read out from the RAM 37 and are stored in a buffer register, not shown. Step 51 is then reached to ascertain whether the vehicle speed V read in step 50 indicates 0 (zero) or not. When it does not indicate 0, step 52 is executed, wherein a manual steering torque value TM is calculated based upon the steering rotary angle data $\theta 1$ and the actually steered angle $\theta 2$ read as above and in accordance with the following equation:

$$TM = \alpha(\theta 1 - \theta 2).$$

The value $\alpha$ in this equation may be a constant or may be a variable calculated from a functional equation which includes the control inputs $\theta 1$ and $\theta 2$ as its parameters.

However, when the vehicle speed V is ascertained to be zero in step 51, it is determined in step 53 whether a push button switch 28 (FIG. 2) which is provided on a dashboard for controlling the angular position of the steerable wheels has been depressed or not. The program routine is advanced to the aforementioned step 52 when the button switch 28 is determined not to have been depressed or is jumped to the first step 70 of the program shown in FIG. 6(B), which is described hereinafter, when the depression of the button switch 28 is confirmed.

Steps 55 through 57 involve determining whether the change of the actually steered angle value $\theta 2$ trends toward an increase or a decrease and whether the actually steered angle value $\theta 2$ is positive (+) or negative (−). These determinations decide whether the steering wheel 11 is in a right turn situation or in a left turn situation and whether the steering wheel 11 is being rotated away from the neutral position or is being returned. When it is determined that the steering wheel 11 is being rotated rightward away from the neutral position, step 62 is reached after setting zero (0) in a flag, not shown, in step 58. When it is determined that the steering wheel 11 is being returned after a right turn, the flag is set to store "1" in step 59 leading to step 63. When the leftward turn of the steering wheel 11 away from the neutral position is ascertained, the flag is set to indicate "1" in step 60, from which the program routine is then forwarded to the above-noted step 62. Further when the rightward return of the steering wheel 11 is ascertained the flag is set with "1" in step 61, whereupon the program routine is advanced to step 64. The signal "1" or "0" stored in the flag is used to designate the direction toward which assisting power is to be given to the steering mechanism, that is, the direction toward which the solenoid valve 20 is to be changed over.

In step 62, the characteristic map I of the fixed program shown in FIG. 3 is searched by the references of the vehicle speed value V and the steering torque value TM for a control current value i, which is then stored in the RAM 37. Likewise, in each of steps 63 and 64, the return map II is searched by the reference of the vehicle speed value V for a control current value i, which is then stored in the RAM 37. The flag is checked in step 65 as to whether it is "0" or not. The output port (a) of the solenoid selector 46 is selected in step 66 when the flag is in "0"-state, while the output port (b) of the solenoid selector 46 is selected in step 67 when the flag is not in "0"-state. Any of the control current values i which were searched in steps 62, 63 and 64 are set in the output buffer register in step 68, from which return is then made to the first step 50, whereby the above-described processings are then repeatedly executed. The control current value i stored in the output buffer register is output to the duty register 41 at the predetermined time interval To, as mentioned previously and is subjected to the duty control so as to be then output from one of the output ports (a) and (b) which is selected based upon the status of the flag.

Figure 6B:
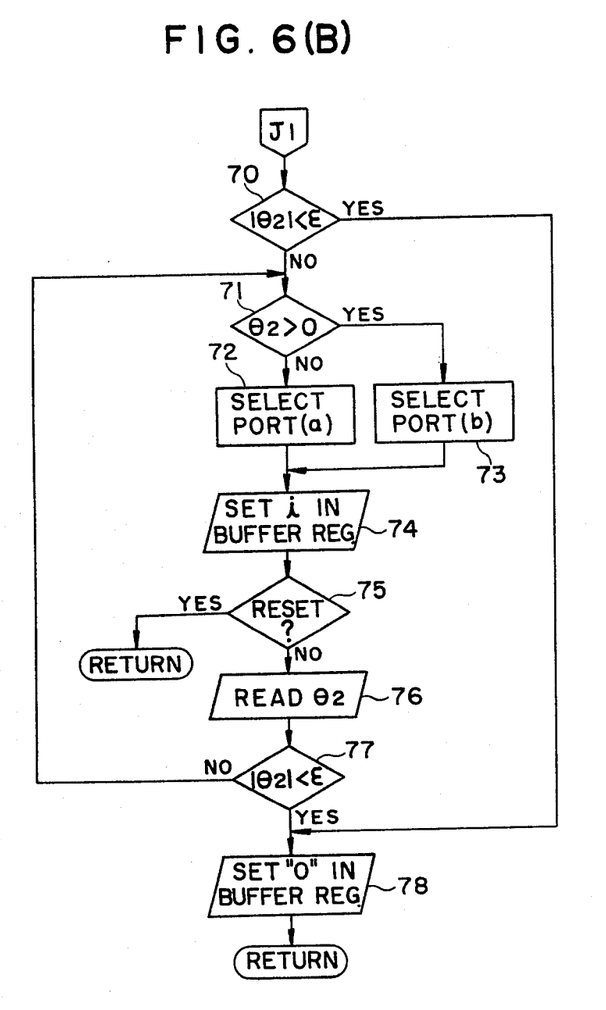

FIG. 6(B) is illustrative of a program used for the control operation wherein the steerable wheels are oriented to be parallel with the vehicle body while the vehicle is stopped or parked. The manipulation of the push button switch 28 enables this program to be started as mentioned previously.

First of all step 70 is executed to judge whether the absolute value $|\theta 2|$ of the actually steered angle value $\theta 2$ is smaller than a minimum set value $\epsilon$ or not. When the absolute value $|\theta 2|$ is smaller than the minimum set value $\epsilon$, in other words, when the steerable wheels are approximately in parallel with the vehicle body, the program routine is jumped to step 78 to set zero (0) in the output buffer register and then, is returned to the first step 50 shown in FIG. 6(A). When the absolute value $|\theta 2|$ is ascertained to be larger than the minimum set value $\epsilon$, it is ascertained in step 71 whether the actually steered angle value $\theta 2$ is larger than zero (0) or not, which means whether the steerable wheels have been oriented towards the right or towards the left. The results of this determination controls the selection of the output ports (a) and (b) of the solenoid selector 46 in step 72 or 73.

Step 74 is then executed wherein a predetermined control current i is set in the output buffer register, and the push button switch 28 provided on the dashboard is determined to have been depressed or not in step 75. When the button switch 28 has not been depressed, the execution of this program is halted to return to step 50 in FIG. 6(A). When the button switch has been depressed, the actually steered angle $\theta 2$ is read in step 76 and is determined in step 77 as to whether it is smaller than the minimum set value $\epsilon$ or not. When the absolute value $|\theta 2|$ is larger than the minimum set value $\epsilon$, return is made from step 77 to step 71 to repeat the foregoing processings. However, when the absolute value $|\theta 2|$ is confirmed to have become smaller than the minimum set value $\epsilon$, step 78 is then reached wherein zero (0) is set in the output buffer register as mentioned earlier.

The preferred embodiment is described with respect to the steering characteristic control based upon the steering torque TM and the vehicle speed V, the biasing control during return of the steering wheel 11, and the direction control of the steerable wheels during stopping of the vehicle. It is to be noted however that the controls of the above-described kinds are typical examples to which the present invention are applicable and accordingly, that the application of the present invention is not limited to such kinds of controls. It is further to be noted that although in the foregoing embodiment, the steering torque TM is obtained from the outputs of the steering wheel rotary angle sensor 18 and the actually steered rotary angle sensor 19 through an arithmetic operation, it may be detected directly from the torsional magnitude of the torsion bar 12.

Obviously, numerous additional modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. A control system for a power steering device having a steering force transmitting mechanism for transmitting manual steering force applied to a steering wheel to at least one steerable wheel, said steering force transmitting mechanism including a fluid supply and a power cylinder coupled to the fluid supply for imparting assisting force thereto, said control system comprising:
    a solenoid valve fluidally coupled between said power cylinder and said fluid supply, including,
        (i) a valve chamber and a spool slidably received in said valve chamber without any mechanical connection with said steering force transmitting mechanism for controlling the supply and exhaust of pressurized fluid to and from said power cylinder, and
        (ii) a pair of solenoids for controlling the sliding movement of said spool;
    first and second detecting means for detecting the rotary angular position of said steering wheel and the vehicle driving speed so as to output rotary angular position data and driving speed data, respectively;
    memory means for storing a plurality of first control values respectively associated with various vehicle driving speeds; and
    control circuit means connected to said pair of said solenoids and said memory means and responsive to said rotary angular position data and said driving speed data respectively supplied from said first and second detecting means for selecting one of said pair of said solenoids and one of said plurality of said first control values and for applying to said selected one of said first pair of said solenoids an electric current having a value corresponding to said selected one of said plurality of said first control values,
    whereby said assisting force generated by said power cylinder is controlled in correspondence to said detected vehicle driving speed.

2. A control system as set forth in claim 1, further comprising:
    said memory means also stores a plurality of second control values respectively associated with various vehicles driving speeds;
    said control circuit means comprising,
    a digital computer connected to said memory means and said first and second detecting means and operable for repeatedly executing a first program including the following steps of,
        (a) reading said detected rotary angular postion data and said detected driving speed data,
        (b) determining the rotational direction of said steering wheel from said detected rotary angular position data,
        (c) reading out from said memory means one of said plurality of said first control values which is associated with said detected driving speed when said steering wheel is determined in step (b) as being rotated away from a neutral position and one of said plurality of said second control values which is associated with said detected driving speed when said steering wheel is determined in step (b) as being rotated toward said neutral position, and
        (d) outputting said one of said pluralities of said first and second control values which is read out in step (c) along with selection data which is obtained as a result of said determination in step (b) to designate one of said pair of said solenoids; and
    solenoid drive circuit means connected to said pair of said solenoids for selecting one of said pair of said solenoids in response to said selection data and for applying to said selected one of said pair of said solenoids electric current whose value corresponds to said one of said pluralities of said first and second control values.

3. A control system as set forth in claim 2, comprising:
    said control circuit means further comprising a switch for instructing the returning of said steering wheel to said neutral position;
    said digital computer further operable to execute repeatedly a second program including the following steps of,
        (e) reading said detected rotary angular position data and said detected driving speed data,
        (f) determining whether said detected driving speed data indicates approximately zero or not, (g) determining from said detected rotary angular position data the existence of an angular deviation of said steering wheel from said neutral position more than a predetermined angle and the direction of said angular deviation when it is determined in step (f) that said detected driving speed data indicates approximately zero and (h) outputting to said solenoid drive circuit means a fixed control value along with said selection data which is determined in accordance with said determined direction of said angular deviation when said angular deviation of said steering wheel is determined to exceed said predetermined angle in step (g); and said solenoid drive circuit means also responsive to said selection data and said fixed control value for selecting one of said pair of said solenoids designated by said selection data and for applying to said selected one of said pair of said solenoids electric current whose value corresponds to said fixed control value.

4. A control system as set forth in claim 1, comprising:

said memory means also storing a fixed control value; and said control circuit means comprising, a switch for instructing the returning of said steering wheel to a neutral position, a digital computer connected to said memory means and said first and second detecting means and operable to execute repeatedly a control program including the following steps of, (a) reading said detected rotary angular position data and said detected driving speed data, (b) determining whether said detected driving speed data indicates approximately zero, (c) determining the rotational direction of said steering wheel from said detected rotary angular position data when it is determined in step (b) that said detected driving speed data indicates approximately zero, (d) reading out from said memory means one of said plurality of said first control values which is associated with said detected driving speed data when said steering wheel is determined in step (c) as being rotated away from said neutral position, (e) outputting said one of said plurality of said first control values along with selection data which is obtained as a result of said determination in step (c) to designate one of said pair of said solenoids, (f) determining from said detected rotary angular position data the existence of an angular deviation of said steering wheel from said neutral position more than a predetermined angle and the direction of said angular deviation when it is determined in step (b) that said detected driving speed indicates approximately zero, (g) reading out said fixed control value from said memory means when said angular deviation of said steering wheel is confirmed to exceed said predetermined angle in step (e), and (h) outputting said fixed control value read out in step (f), along with selection data which is determined in accordance with the determination of said angular deviation direction in step (e); and solenoid drive circuit means connected to said pair of solenoids for selecting one of said pair of said solenoids designated by said selection data and for applying to said selected one of said pair of said solenoids electric current whose value corresponds to either of said one of said plurality of said first control values and said fixed control values.

* * * * *